United States Patent [19]

Pike

[11] Patent Number: 4,823,633

[45] Date of Patent: Apr. 25, 1989

[54] GEAR LOCK

[75] Inventor: Timothy D. Pike, Hayward, Calif.

[73] Assignee: f.m.e. Corporation, Hayward, Calif.

[21] Appl. No.: 99,948

[22] Filed: Sep. 23, 1987

[51] Int. Cl.⁴ .................. F16D 49/00; G05G 5/18
[52] U.S. Cl. ......................... 74/411.5; 74/530;
74/577 M; 74/813 L; 188/69
[58] Field of Search ............... 74/154, 155, 411.5, 74/530, 813 L; 188/31, 60, 69

[56] References Cited

U.S. PATENT DOCUMENTS

| | | | |
|---|---|---|---|
| 449,843 | 4/1891 | Blanchard | 188/69 X |
| 1,140,199 | 5/1915 | Smith | 74/577 |
| 1,366,114 | 1/1921 | Boggs | 70/190 X |
| 1,393,867 | 10/1921 | White | 70/190 X |
| 1,394,357 | 10/1921 | Rose | 70/190 |
| 1,394,872 | 10/1921 | White | 70/190 X |
| 1,742,963 | 1/1930 | McGlynn | 70/190 X |
| 1,860,418 | 5/1932 | Hummert | 74/530 |
| 1,964,308 | 6/1934 | Benario | 70/190 |
| 2,954,849 | 10/1960 | Bigos | 74/530 X |
| 3,373,622 | 3/1968 | Stautmeister | 74/143 |

FOREIGN PATENT DOCUMENTS 844955 8/1960 United Kingdom ................ 74/530

Primary Examiner—Allan D. Herrmann
Attorney, Agent, or Firm—Townsend and Townsend

[57] ABSTRACT

A gear lock is moved between a free movement position, at which the gear is freely rotatable, and a locking position, at which the gear and gear lock become self-locking. The gear lock has two locking faces facing one another which fit around one or more teeth with the locking faces adjacent the sides of the gear teeth. The locking faces and the gear sides define tangent contact planes at the positions of contact. The tangent of the angle between the direction of movement of the gear tooth at the contact region and the contact plane is less than the coefficient of friction between the gear and the gear lock. Doing so makes the gear lock self-locking since the component of the gear force parallel to the contact plane does not exceed the frictional force between the two surfaces. The gear lock also provides any final positioning of the gear as it moves into the locking position with the gear teeth opposite the locking faces.

11 Claims, 1 Drawing Sheet

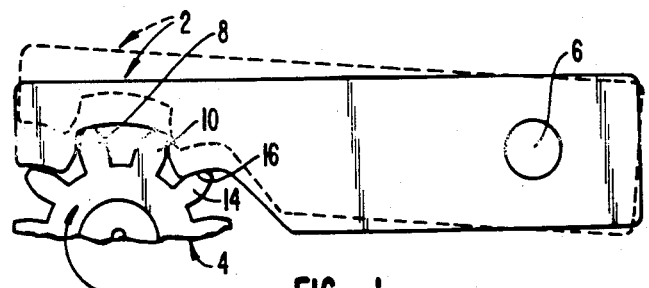
FIG._1.
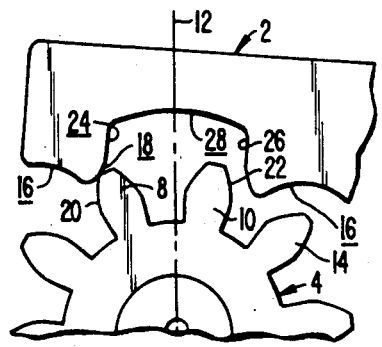
FIG._2A.
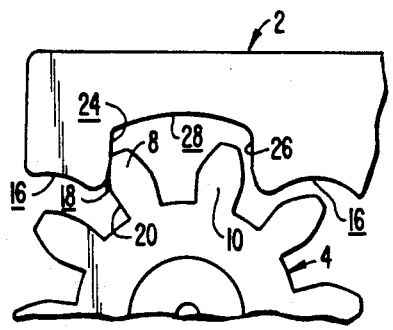
FIG._2B.
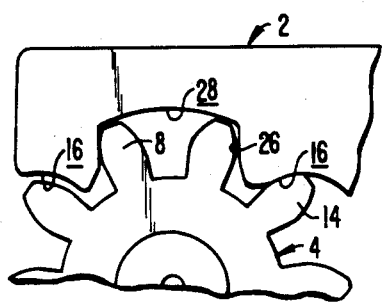
FIG._2C.
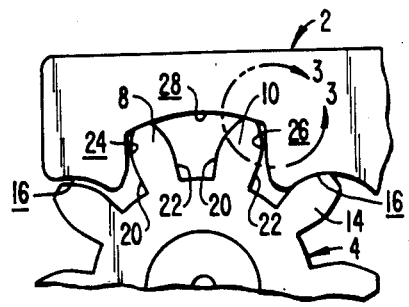
FIG._2D.
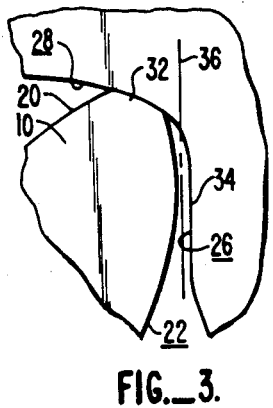
FIG._3.
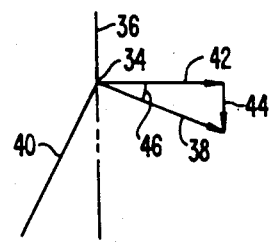
FIG._4.

GEAR LOCK

BACKGROUND OF THE INVENTION

Mechanisms and devices often have gears which need to be locked into a certain position. One way this has been accomplished is through the radial movement of a locking member into engagement with the gear teeth, as shown in U.S. Pat. No. 1,742,963 to McGlynn. This type of lock relies on the interference of the teeth of the gear lock with the teeth of the gear by positively restricting any movement of the lock away from the gear. The McGlynn positioning mechanism includes a spring-loaded gear locking member having teeth which radially engage the teeth of the circular gear. To rotate freely, the gear would have to bias the gear lock radially, overcoming both the frictional forces between the two surfaces and the biasing force created by the gear lock. Because of the angle at which the gear tooth acts on the gear lock, the gear is effectively locked in place.

This type of gear locking mechanism may not be suitable for some applications. For example, it may not be desirable or even possible to use a gear lock in which the teeth of the lock are prevented from disengagement with the gear teeth by forcing the gear lock against the gear.

SUMMARY OF THE INVENTION

The present invention is directed to a gear lock and method by which a gear is both properly positioned and locked in place without the need for significant biasing forces being applied to the gear lock. The gear lock is therefore self-locking with the gear. This is accomplished by a combination of appropriately configuring the locking face of the gear lock and adjusting the coefficient of friction between the side of the gear tooth and the locking face of the gear lock. Doing so creates the situation in which tangent of the angle between the direction of movement of the gear tooth at the position of contact is less than the coefficient of friction. Movement of the gear is therefore not possible, regardless of the force applied to the gear (within the strength of the gear teeth), without requiring that any significant biasing force be applied to the gear lock. The resulting structure is simple and compact while providing the necessary locking feature.

The gear lock is moved between a free movement position, at which the gear is freely rotatable, and a locking position, at which the gear and gear lock become self-locking. The gear lock has at least one and preferably two locking faces, the two faces facing in generally opposite directions. The locking faces are configured so that when the gear lock is in the locking position, the locking faces lie adjacent the sides of one or more gear teeth. The locking faces and the gear sides define contact planes at the position of contact. The coefficients of friction between the locking faces and gear sides are such that the tangents of the angles between the directions of movement and the contact planes are each less than the coefficients of sliding friction between the sides of the gear teeth and the locking faces of the gear lock. What results is a situation in which the tangent of the ramp angle (in terms of a weight resting on an inclined plane) is less than the coefficient of friction. This makes the gear lock self-locking without the need for excessively high coefficients of friction. For example, coefficients of sliding friction of only 0.1 to 0.15 have been found sufficient to achieve the desired results.

The gear lock may include other surfaces which index and direct the gear teeth into the proper position opposite the locking faces. Thus, the gear lock according to this aspect of the invention both makes any final positional adjustments to the gear and locks the gear in place against rotation from the proper position.

Other features and advantages of the invention will appear from the following description in which the preferred embodiment has been set forth in detail in conjunction with the accompanying drawings.

BRIEF DESCRIPTION OF THE DRAWINGS

FIG. 1 is a side view showing the gear lock of the invention while engaged with a gear, the gear in a proper rotary position.

FIGS. 2A–2D show a portion of the gear lock and gear of FIG. 1 in four different positions as the gear lock moves from the free movement position, shown in dashed lines in FIG. 1, to the locking position of FIG. 1 thereby indexing the gear in a clockwise direction towards the proper rotary position of FIG. 1.

FIG. 3 is an enlarged view of a portion of FIG. 1 taken along line 3—3 of FIG. 2D.

FIG. 4 is a force vector diagram illustrating the force components at the contact position in FIG. 3.

DETAILED DESCRIPTION OF THE PREFERRED EMBODIMENT

The present invention is based upon the recognition that for a block to slide down an inclined plane, the tangent of the angle of the plane must be greater than the coefficient of the friction. Recognizing this, and applying it to the problem of positioning and locking a gear in place without the need to have a biasing force applied to the gear lock, led to the present invention.

Turning now to FIG. 1, a gear lock 2 is shown positioned adjacent a gear 4 for pivotal movement about a pivot 6 between a free movement position, shown in dashed lines, and the locking position. In the preferred embodiment, gear lock 2 is a metal bar having a width commensurate with the width of gear 4. In the preferred embodiment, the proper position of gear 4 is that shown in FIG. 1 with teeth 8, 10 equally spaced from a vertical center line 12.

When gear 4 stops, teeth 8, 10 are not always precisely in their proper position of FIG. 1. Therefore, gear lock 2, during movement from its free movement position to its locking position, must often reposition gear 4 to the proper position. With the present invention this is done in two (or fewer if the rotary misalignment is reduced) steps. First, as shown in FIG. 2A, an inner tooth 8 contacts guide surface 18 of gear lock 2. This causes gear 4 to move in a clockwise direction as shown in the figures. Next, as suggested in FIG. 2B, side 20 of tooth 8 engages a locking face 24 of gear lock 2 as gear lock 2 continues to move towards gear 4. Subsequently, gear tooth 14 engages an indexing surface 16 as illustrated in FIG. 2C which continues to rotate gear 4 clockwise and towards the proper position of FIG. 1. FIG. 2D shows gear lock 2 gear 4 in the FIG. 1 positions with the sides 20, 22 of teeth 8, 10 are positioned adjacent the locking faces 24, 26 of gear lock 2. The movement of gear lock 2 towards the locking position is halted by the engagement of a limit surface 28 of lock 2 with the tips 30, 32 of teeth 8, 10. Note that in FIGS. 2A–2D and 3 the gaps between the sides 20, 22 and faces 24, 26 are exaggerated. In practice, the gaps are preferably smaller than those suggested by the figures.

Referring now primarily to FIGS. 3 and 4, side 22 and locking face 26 are seen to contact at a contact position 34 and thus define a tangent contact plane 36. The abutment of tips 30, 32 of teeth 8, 10 with surface 28 allows the very accurate location of contact position 34 and thus the direction of contact plane 36. Attempted rotation of gear 4 in the clockwise direction tends to move tooth 10 at contact position 34 in the direction of arrow 38, that is perpendicular to radius 40. Thus, the force vector of gear 4 against gear lock 2 at contact position 34 is along arrow 38. This force vector can be broken up into a normal component, indicated by arrow 42, and a parallel component, indicated by arrow 44. If the coefficient of friction between side 22 and face 26 is greater than the tangent of an angle 46, defined between arrows 42 and 38, and thus between the direction of movement of gear tooth 10 at contact position 34 and a line perpendicular to contact plane 36, then side 22 and face 26 will not slide relative to one another since parallel force 44 will never be greater than the coefficient of friction times normal force 42. Accordingly, gear lock 2 becomes a self-locking device with respect to gear 4 without the need for any substantial biasing force urging gear lock 2 against gear 4. The same principles apply with respect to side 20 and locking face 24.

In use, the mechanism or device with which gear lock 2 is used positions gear 4 in approximately the proper position. Gear lock 2 is then pivoted towards gear 4. Depending upon how closely gear 4 is to its proper position of FIG. 1, indexing through the engagement of a tooth with indexing surface 16 and guiding through the engagement of a tooth with a guide surface 18 may be required as gear lock 2 moves to the locking position of FIG. 1. Once gear lock 2 is in the locking position of FIG. 1, attempted rotation of gear 4 causes one of gear teeth 8, 10 to contact the opposed locking face 24, 26 at a respective contact position 34. By virtue of the orientation of contact plane 36 and the selection of the coefficient of friction between the two surfaces, gear movement is prevented even though no substantial force biases gear lock 2 against gear 4.

Modification and variation can be made to the disclosed embodiment without departing from the subject of the invention as defined in the following claims. For example, gear lock 2 may be made such that it straddles a single tooth, rather than two teeth as in the preferred embodiment. In the preferred embodiment, with a ten-toothed gear, it has been found that a coefficient of sliding friction of about 0.1 has been sufficient to permit the self-locking of gear lock 2. With higher coefficients of friction, even greater leeway in the design of gear lock 2 would be possible. The gear being locked could be a rack and the gear lock could be movable other than in a pivotal manner as well.

I claim:

1. A gear locking element, for use with a movable toothed gear having a first gear tooth with a gear side, the gear side movable in a first direction, comprising:
    a body movable between a free movement position and a gear locked position;
    the body having guide surface means for engaging a tip portion of the first gear tooth and guiding the gear towards a proper position during an initial movement of the body from the free movement position to the gear locked position;
    the body having a locking face positioned opposite the gear side when the gear is in the proper position and the body is in the gear locked position, the gear side and locking face defining a tangent contact plane when in contact;
    the contact plane being oriented at a first angle to the first direction;
    the gear side and the locking face having a first coefficient of sliding friction; and
    the tangent of the first angle being less than the first coefficient of sliding friction so that substantial movement of the gear in the first direction is prevented by the engagement of the locking face with the gear side.

2. The gear locking element of claim 1 wherein the body has indexing surface means for engaging a second gear tooth and guiding the gear towards the proper position.

3. The gear locking element of claim 1 wherein the body includes a limit surface for engaging the tip of said first gear tooth when in the gear locked position.

4. A gear locking element, for use with a movable toothed gear having a gear tooth with first and second gear sides, the gear sides movable in first and second directions, comprising:
    a body movable between a free movement position and a gear locked position;
    the body having guide surface means for engaging a tip portion of the first gear tooth and guiding the gear towards a proper position during an initial movement of the body from the free movement position to the gear locked position;
    the body having indexing surface means for engaging a second gear tooth and guiding the gear in the second direction towards the proper positions;
    the body having first and second locking faces positioned opposite the first and second gear sides when the gear is in the proper position and the body is in the gear locked position, the gear sides and locking faces defining first and second contact planes when in contact;
    the first and second contact planes being oriented at first and second angles to the first and second directions;
    the first and second gear sides exhibiting first and second coefficients of friction with the first and second locking faces; and
    the tangents of the first and second angles being less than the first and second coefficients of friction so that movement of the gear in either of the first and second directions is substantially prevented by the engagement of the first and second locking faces with the first and second gear sides.

5. A method for locking a movable gear, including gear teeth having first and second sides, into a chosen position, the gear movable in first and second directions, comprising the following steps:
    selecting a locking element having first and second faces, the faces facing generally opposite direction;
    engaging a tip portion of a gear tooth, having at least one of the first and second sides, during an initial movement of the locking element towards a locking position so to initially guide the gear towards the chosen position;
    moving the locking element to the locking position with the first and second faces opposite the first and second sides;

the selecting step carried out by configuring the faces so the first and second faces contact the first and second sides at first and second respective contact positions, the faces and sides at the contact positions defining first and second contact planes oriented at first and second chosen angles to the first and second directions; and limiting the first and second chosen angels to angles with tangents less than the coefficients of friction between the sides and the faces so to lock the gear against substantial movement.

6. The method of claim 5 wherein the selecting step is carried out by selecting a locking element having first and second faces which generally face one another.

7. The method of claim 5 wherein the moving step is carried out by pivoting the locking element about a pivot point from a free movement position to a locking position.

8. The method of claim 5 wherein the moving step includes the step of engaging a gear tooth, other than a gear tooth having at least one of said first and second sides, by the locking element after the tip portion engaging step to continue guiding the gear towards the chosen position.

9. The method of claim 5 wherein the third direction is a rotary direction.

10. A method for locking a movable gear, including a gear tooth having a side, into a chosen position, the side movable in a direction, comprising the following steps:

selecting a locking element having a face;

engaging a tip portion of a gear tooth, having at least one of the first and second sides, during an initial movement of the locking element towards a locking position so to initially guide the gear towards the chosen position;

engaging a gear tooth, other than a gear tooth having at least one of said first and second sides, by the locking element after the tip portion engaging step to continue guiding the gear towards the chosen position;

moving the locking element to the locking position with the face opposite the side;

the selecting step carried out by configuring the face so the face contacts the side at a contact position, the face and side at the contact position defining a contact plane oriented at a chosen angle to the direction; and ensuring the coefficient of friction between the side and the face is greater than the tangent of the chosen angle so to lock the gear against substantial movement in the direction.

11. A method for locking a movable gear, including a gear tooth having a side, into a chosen position, the side movable in a direction, comprising the following steps:

selecting a locking element having a face;

engaging a tip portion of a gear tooth, having at least one of the first and second sides, during an initial movement of the locking element towards a locking position so to initially guide the gear towards the chosen position;

engaging a gear tooth, other than a gear tooth having at least one of said first and second sides, by the locking element after the tip portion engaging step to continue guiding the gear towards the chosen position;

moving the locking element to the locking position with the face opposite the side;

the selecting step carried out by configuring the face so the face contacts the side at a contact position, the face and side at the contact position defining a contact plane oriented at a chosen angle to the direction; and limiting the chosen angle to an angle with a tangent less than the coefficient of friction between the side and the face so to lock the gear against substantial movement in the direction.

* * * * *